United States Patent
Holzapfel (10) Patent No.: US 9,733,069 B2
(45) Date of Patent: Aug. 15, 2017

(54) OPTICAL POSITION-MEASURING DEVICE

(71) Applicant: DR. JOHANNES HEIDENHAIN GMBH, Traunreut (DE)

(72) Inventor: Wolfgang Holzapfel, Obing (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 15/050,620

(22) Filed: Feb. 23, 2016

(65) Prior Publication Data
US 2016/0245642 A1    Aug. 25, 2016

(30) Foreign Application Priority Data

Feb. 23, 2015    (DE) .................. 10 2015 203 188

(51) Int. Cl.
| | | |
|---|---|---|
| *G01B 11/02* | (2006.01) | |
| *G01B 11/14* | (2006.01) | |
| *G01D 5/38* | (2006.01) | |

(52) U.S. Cl.
CPC ............... *G01B 11/14* (2013.01); *G01D 5/38* (2013.01)

(58) Field of Classification Search
CPC .. G01B 11/14; G01B 11/002; G01B 2290/30; G01D 5/266; G01D 5/38; G01D 5/347; G01D 5/34715; G01D 5/34746; G01D 5/3473; G01D 5/34753
USPC ......................................... 356/499
See application file for complete search history.

(56) References Cited

U.S. PATENT DOCUMENTS

| 6,166,817 A | 12/2000 | Kuroda | |
|---|---|---|---|
| 7,573,581 B2 | 8/2009 | Holzapfel | |
| 7,858,922 B2* | 12/2010 | Holzapfel | ............ G01D 5/2457 250/231.13 |

(Continued)

FOREIGN PATENT DOCUMENTS

| EP | 1 762 828 | 3/2007 |
|---|---|---|
| EP | 2 848 899 | 3/2015 |

OTHER PUBLICATIONS

European Search Report issued in corresponding European Patent Application No. 16 15 4260.0, dated May 18, 2016.

*Primary Examiner* — Kara E Geisel
*Assistant Examiner* — Jonathon Cook
(74) *Attorney, Agent, or Firm* — Andrews Kurth Kenyon LLP (57) ABSTRACT

An optical position-measuring device for detecting the position of two objects movable relative to each other includes a measuring standard that is joined to one of the two objects and has a measuring graduation having a periodic arrangement of graduation regions along at least a first graduation direction. The position-measuring device also includes a scanning unit having a plurality of optical elements, which is disposed in a manner allowing movement relative to the measuring standard. Via the arrangement and formation of the optical elements of the scanning unit, a scanning beam path results in which partial beams of rays reaching interference propagate in mirror symmetry in relation to a plane of symmetry and either fall in V-shaped fashion on the measuring standard and/or are reflected back in a V-shape by the measuring standard. The plane of symmetry is tilted by a defined tilt angle about an axis of rotation that is oriented parallel to the surface of the measuring standard and extends in a direction perpendicular to the first graduation direction.

13 Claims, 6 Drawing Sheets

(56) References Cited

U.S. PATENT DOCUMENTS

| | | | |
|---|---|---|---|
| 2006/0139654 A1* | 6/2006 | Takahashi | G01D 5/38 356/494 |
| 2007/0058173 A1* | 3/2007 | Holzapfel | G01D 5/38 356/499 |
| 2011/0286004 A1* | 11/2011 | Holzapfel | G01D 5/38 356/499 |
| 2012/0050748 A1 | 3/2012 | Kuroda | |
| 2013/0114061 A1* | 5/2013 | de Groot | G01D 5/266 355/72 |
| 2013/0114062 A1* | 5/2013 | Liesener | G01D 5/38 355/72 |
| 2015/0070711 A1 | 3/2015 | Holzapfel | |

\* cited by examiner

OPTICAL POSITION-MEASURING DEVICE

CROSS-REFERENCE TO RELATED APPLICATIONS

The present application claims priority to Application No. 10 2015 203 188.8, filed in the Federal Republic of Germany on Feb. 23, 2015, which is expressly incorporated herein in its entirety by reference thereto.

FIELD OF THE INVENTION

The present invention relates to an optical position-measuring device.

BACKGROUND INFORMATION

In conventional position-measuring devices for detecting the position of two objects movable relative to each other, usually the position of a scanning unit relative to a measuring standard having a measuring graduation disposed on it is determined along the graduation direction of the measuring standard, the graduation direction corresponding to the measuring direction; in this case, the scanning unit and the measuring standard are each joined to one of the two movable objects. In conventional devices, the so-called sensitivity vector of the position-measuring device, which denotes the specific effective measuring direction, is usually oriented parallel to the surface of the measuring standard.

In addition, certain conventional position-measuring devices have a sensitivity vector oriented obliquely to the surface of a measuring standard having a reflective measuring graduation. For example, reference is made to European Published Patent Application No. 1 762 828, which is expressly incorporated herein in its entirety by reference thereto. In such a position-measuring device, the inclined orientation of the sensitivity vector is ensured by an asymmetrical formation of the interferential scanning beam path. In correspondent scanning beam paths, an incoming beam of rays is split into at least two partial beams of rays that are ultimately brought to interfering superposition. With the aid of such position-measuring devices, it is possible to acquire position information with regard to a relative movement of the scanning unit and measuring standard along a lateral measuring or shift direction and along a vertical measuring or shift direction. That is, with the aid of a position-measuring device of this type, position changes are able to be detected along two translatory degrees of freedom of movement. In such a position-measuring device, the path lengths of the interfering partial beams of rays are usually equal only at a nominal scanning distance between the scanning unit and measuring standard. If the measuring standard or the scanning unit is moved out of this nominal scanning distance, different path lengths in the partial beams of rays reaching interference then result. Consequently, a possible change in the wavelength of the light source used influences the phase of the interfering partial beams of rays, and therefore also the position information ascertained. For that reason, the scanning optical systems of position-measuring devices of this type are described as chromatic. Therefore, the light source used in them must exhibit sufficient coherence length and an extremely low phase jitter. In order to ensure this, a complex stabilization of such a light source is necessary, making it correspondingly costly.

SUMMARY

Example embodiments of the present invention provide an optical position-measuring device that has an inclined sensitivity vector and is insensitive to wavelength changes in the case of all permissible scanning distances.

According to an example embodiment of the present invention, an optical position-measuring device for detecting the position of two objects movable relative to each other includes:
 a measuring standard that is joined to one of the two objects and has a measuring graduation having a periodic arrangement of graduation regions along at least a first graduation direction, and
 a scanning unit having a plurality of optical elements, which is disposed in a manner allowing movement relative to the measuring standard, the arrangement and formation of the optical elements of the scanning unit resulting in a scanning beam path in which partial beams of rays reaching interference propagate in mirror symmetry in relation to a plane of symmetry and either fall in V-shaped fashion on the measuring standard and/or are reflected back in a V-shape by the measuring standard. The plane of symmetry is tilted by a defined tilt angle about an axis of rotation that is oriented parallel to the surface of the measuring standard and extends in a direction perpendicular to the first graduation direction.

Preferably, the graduation period of the measuring graduation and the tilt angle are selected such that the scanning beam path in the scanning unit is identical to the scanning beam path in the untilted state, in which the plane of symmetry is oriented perpendicular to the surface of the measuring standard.

Partial beams of rays may reach interference that result from non-symmetrical orders of diffraction at the measuring graduation.

In this context, partial beams of rays are able to reach interference that result from one of the following combinations of orders of diffraction at the measuring graduation:
 +3rd/−1st order of diffraction,
 +1st/0th order of diffraction,
 −3rd/+1st order of diffraction, and
 −1st/0th order of diffraction It is possible for the measuring graduation to take the form of a reflection phase grating which is optimized to a high diffraction efficiency of the orders of diffraction used for the signal generation.

In addition, the scanning unit may include at least one scanning plate having a plurality of optical elements, the scanning plate being disposed perpendicular to the plane of symmetry.

It may further be provided that a scanning plate disposed in the scanning unit is transparent, two first and two second scanning gratings are located on its side facing the measuring standard, and two reflectors are located on the side of the scanning plate opposite that, the reflecting sides of the reflectors being oriented in the direction of the measuring standard.

In this case, the scanning unit may be arranged such that a beam of rays emitted by a light source:
 strikes the measuring graduation, where it is split into two partial beams of rays that correspond to two different orders of diffraction and are reflected back in a V-shape to the scanning unit;
 in the scanning unit, the two reflected-back partial beams of rays pass through the two first scanning gratings in the direction of the two reflectors, and in so doing, undergo a deflection effect oriented anti-parallel to the direction of incidence, as well as only a focusing effect perpendicular to the first graduation direction;

the partial beams of rays thus deflected and focused then in each case impinge on the reflectors and are reflected back in the direction of the measuring standard;

the two reflected-back partial beams of rays then pass through the two second scanning gratings in the direction of the measuring standard, and in so doing, undergo a deflection effect in the first graduation direction as well as only a collimating effect perpendicular to the first graduation direction, so that the two partial beams of rays then propagate in V-shaped fashion in the direction of the measuring standard;

where the superposed partial beams of rays are diffracted once more and reflected back in the direction of the scanning unit.

The scanning unit may include at least one splitting element, two deflecting elements, two reflectors, and two lenses.

In this case, the scanning unit may be arranged such that a beam of rays emitted by a light source:

is split via the splitting element into two partial beams of rays, each of which then propagates in the direction of the deflecting elements;

the partial beams of rays are deflected via the deflecting elements, so that they propagate in a V-shape in the direction of a first point of incidence on the measuring graduation;

at the first point of incidence on the measuring graduation, the partial beams of rays in each instance undergo a first diffraction and V-shaped reflection back in the direction of the lenses and reflectors in the scanning unit;

the partial beams of rays traverse the lenses a first time, are reflected back by the reflectors in V-shaped fashion in the direction of incidence, and pass through the lenses a second time; and the partial beams of rays then impinge on the measuring graduation at a second point of incidence and in each case undergo a second diffraction and a V-shaped reflection back in the direction of the deflecting elements in the scanning unit.

The scanning unit may include at least one transparent scanning plate as well as a structured photodetector, first and second scanning gratings being disposed on the side of the scanning plate facing the incoming beam of rays.

In this case, the scanning unit may be arranged such that a beam of rays emitted by a light source:

passes unaffected through the scanning plate and then strikes the measuring graduation, where it is split into two partial beams of rays that correspond to two different orders of diffraction and are reflected back in V-shaped fashion to the scanning unit; and in the scanning unit, the two reflected-back partial beams of rays pass through one of the two respective scanning gratings, and in so doing, undergo a deflection effect in the direction of the plane of symmetry and then propagate in the direction of the structured photodetector, where they come interferingly to superposition.

Moreover, it is possible for a second, identically formed scanning unit to be firmly joined mechanically to the scanning unit, the two scanning units being tilted by the same angular amount but in opposite directions about assigned axes of rotation oriented parallel to one another.

In this context, the measuring graduation may take the form of a two-dimensional cross grating that includes periodic arrangements of graduation regions along the first and second graduation direction, and has three pairs of position-measuring devices firmly joined mechanically to one another, two pairs being disposed parallel to the first graduation direction and the third pair being disposed parallel to the second graduation direction.

The optical position-measuring device described herein provides that in a large range of permissible scanning distances, it is insensitive to fluctuations in the light wavelength used. Correct position values always result, even in the event of possible changes in the wavelength. Therefore, markedly less complex and more favorable light sources may be used in the position-measuring device.

In addition, it is also possible to use the scanning unit of the position-measuring device for scanning in which the sensitivity vector is oriented parallel to the surface of the measuring standard; these are customary practical applications in which, for example, a relative shift of the scanning unit and measuring standard along a measuring direction is intended to be determined metrologically. It is therefore no longer necessary to develop and keep on hand different scanning units for different measuring tasks.

Further features and aspects of example embodiments of the present invention are described in more detail below with reference to the appended Figures.

DETAILED DESCRIPTION

Before a number of exemplary embodiments of the optical position-measuring device are described in detail with reference to the Figures, first of all, a few concepts in connection therewith are explained below.

To that end, reference is made once again to scanning optical systems of position-measuring devices in which the sensitivity vector is oriented parallel to the surface of the measuring standard during measuring operation. In such scanning optical systems, a beam of rays emitted by a light source is usually split into two partial beams of rays. The two partial beams of rays are diffracted at the measuring graduation of the measuring standard into different orders of diffraction, and are eventually superposed and brought to interference. In this manner, scanning signals phase-shifted relative to each other are able to be generated, from which position values are formed by incremental counting and interpolation. Some such scanning optical systems produce partial beams of rays which, from the splitting-up to the superposition, extend in mirror symmetry in relation to a plane of symmetry. In this operating mode, the planes of symmetry of such scanning beam paths are perpendicular to the surface of the measuring standard, and therefore also perpendicular to the graduation direction of the measuring graduation of the measuring standard. In this connection, the graduation direction corresponds to the grating vector of the measuring graduation, the grating vector always being oriented perpendicular to the grating lines of the measuring graduation; therefore, hereinafter, the terms graduation direction and grating vector are used interchangeably. Because of the mirror symmetry of the scanning beam path, equally long propagation paths of the partial beams of rays result between the splitting and the recombination. The scanning optical system is thus achromatic, that is, the wavelength of the light source as well as its spectral distribution have no influence on the phase and the degree of modulation of the scanning signals generated.

Moreover, scanning optical systems in which the partial beams of rays reaching interference propagate in mirror symmetry in relation to a plane of symmetry may also be arranged such that what is termed the neutral pivot point of the scanning lies on the measuring standard. In this connection, that point in space about which either the scanning unit or the measuring standard is able to be tilted without the position value displayed being changed is referred to as the neutral pivot point. In the event of a tilting about the neutral pivot point, the propagation paths covered by the two partial beams of rays between the splitting and recombination remain equal. Scanning optical systems of this type having specularly symmetric partial beams of rays and neutral pivot point on the measuring standard are also referred to hereinafter as symmetrical V-type scanning optical systems. This designation thus defines all those scanning optical systems whose two partial beams of rays reaching interference first of all propagate in mirror symmetry in relation to a plane of symmetry, and secondly, fall in V-shaped fashion on one common scanning location on the measuring standard and/or are reflected back in a V-shape from the scanning location by the measuring standard. In this context, only the points of incidence of both partial beams of rays on the measuring standard along the graduation direction or along the grating vector must be nearly identical; a displacement perpendicular to the grating vector or along the longitudinal direction of the line-like graduation regions is unimportant.

In addition to such scanning optical systems having identical or nearly identical points of incidence of the two partial beams of rays on the measuring standard along the grating vector, there are further symmetrical scanning optical systems whose neutral pivot point lies on the measuring standard. European Published Patent Application No. 2 848 899, which is expressly incorporated herein in its entirety by reference thereto, includes a general description of the connection between an arbitrary beam path of a scanning optical system and the associated position of the neutral pivot point. Based on this description, further scanning optical systems having a symmetrical beam path may be indicated, whose neutral pivot point lies on the measuring standard. All these scanning optical systems are also denoted hereinafter as symmetrical V-type scanning optical systems.

During operation of such a symmetrical V-type scanning optical system with a sensitivity vector parallel to the measuring-standard surface, the scanning unit is aligned with respect to the measuring standard having graduation period $d_M$ such that the plane of symmetry mentioned above is perpendicular to the surface of the measuring standard and also perpendicular to the grating vector of the measuring graduation of the measuring standard. This is called parallel alignment of scanning unit and measuring standard.

An aspect of example embodiments of the present invention is to tilt such a symmetrical V-type scanning optical system or the associated plane of symmetry by a specific tilt angle α about an axis of rotation that is oriented parallel to the surface of the measuring standard and extends in a direction perpendicular to the grating vector of the measuring graduation of the measuring standard, that is, parallel to the longitudinal-extension direction of the graduation regions of the measuring graduation. Suitable further measures ensure that the scanning beam path in terms of the scanning unit is identical to the scanning beam path in the untilted state. In addition to the selection of a suitable tilt angle α, the additional measures include the selection of an appropriate graduation period of the measuring graduation as well as a selection of suitable partial beams of rays reaching interference, that result from non-symmetrical orders of diffraction at the measuring graduation.

A more detailed description of this aspect is provided below with reference to an optical position-measuring device according to an example embodiment of the present invention.

First Exemplary Embodiment

Figure 1A:
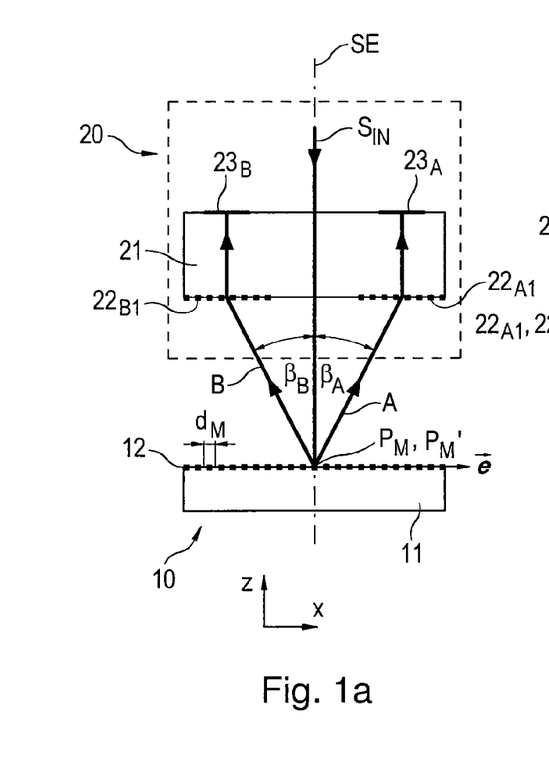
FIGS. 1a to 1c are schematic cross-sectional views of the scanning unit of an optical position-measuring device according to an example embodiment of the present invention, which is used in a position-measuring device that has a sensitivity vector parallel to the surface of the measuring standard scanned.
Figures 1B, 1C:
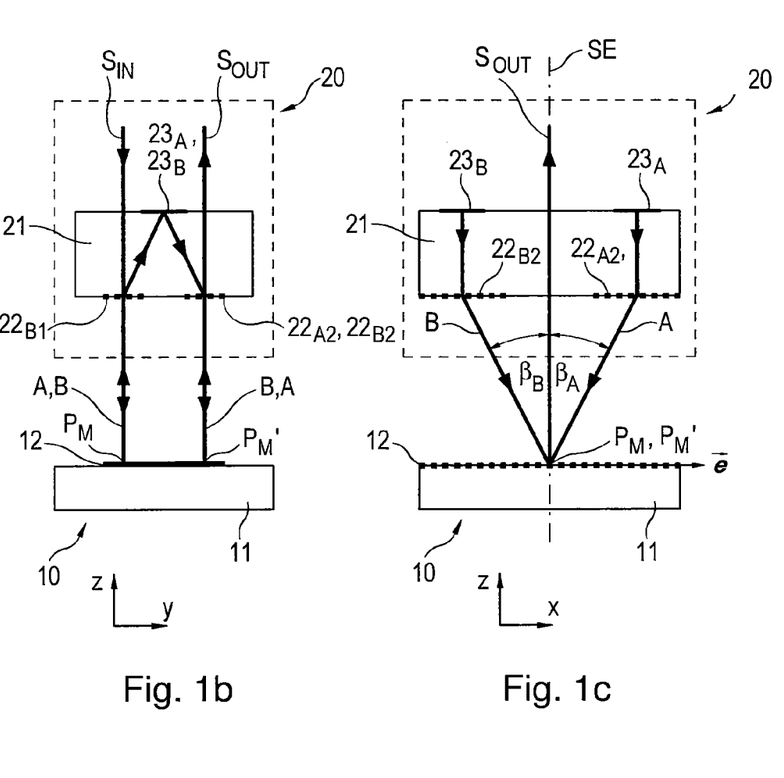

FIGS. 1a to 1c show various views of the scanning beam path of an optical position-measuring device having a symmetrical V-type scanning optical system. Here, sensitivity vector $\vec{e}$ of this scanning optical system is oriented parallel to the surface of the measuring standard and parallel to the grating vector of the measuring graduation or a first graduation direction x; what is meant hereinafter in connection with such an orientation of sensitivity vector $\vec{e}$ is also what is referred to as an in-plane operation of the corresponding position-measuring device. FIG. 1a shows a view of the course of the beam in the xz-plane of beam of rays $S_{IN}$ incoming from a light source up to reflectors $23_A$, $23_B$; in FIG. 1c, the course of the beam is illustrated in the same plane from reflectors $23_A$, $23_B$ up to emergent signal beam of rays $S_{OUT}$ with the superposed partial beams of rays that are propagating in the direction of a detector unit; FIG. 1b shows the complete scanning beam path in the yz-plane.

The optical position-measuring device illustrated in these figures includes a measuring standard 10 that extends along first graduation direction x, as well as a scanning unit 20 that is disposed in a manner allowing movement relative to measuring standard 10 at least along first graduation direction x. Measuring standard 10 and scanning unit 20 are each joined to objects not shown in the figures, e.g., to machine components movable relative to each other. With the aid of the scanning signals generated via the position-measuring device, a downstream machine control is able to control the spatial positioning of these machine components.

Measuring standard 10 includes a graduated-scale support 11, on whose surface a measuring graduation 12 is disposed that includes a periodic arrangement of line-like graduation regions along a first grating vector or along a first graduation direction x; the longitudinal-extension direction of the graduation regions corresponds in the figures to the y-direction. In the present exemplary embodiment, measuring graduation 12 takes the form of a reflection phase grating having graduation period $d_M$ as well as a phase deviation of 180°, and provides a periodic arrangement of graduation regions with different phase-shifting effects for the light falling on them.

Of the various optical elements disposed in scanning unit 20, substantially only a transparent scanning plate 21, as well as reflectors $23_A$, $23_B$ located on its upper side and scanning gratings $22_{A1}$, $22_{A2}$, $22_{B1}$, $22_{B2}$ situated on its lower side are shown in the figures. Not shown, on the other hand, are the light source as well as the detector unit, which, in principle, may likewise be located in scanning unit 20. As an alternative, however, it is also possible to place these elements apart spatially from scanning unit 20 and to connect them to scanning unit 20 with the aid of optical fibers, via which incoming beam of rays $S_{IN}$ and emergent signal beam of rays $S_{OUT}$, respectively, are then transmitted.

As becomes apparent in the following based on the detailed descriptions of the various scanning beam paths, in each case the arrangement and formation of the various optical elements in scanning unit 20 ensure that a scanning beam path results in which partial beams of rays A, B reaching interference propagate in mirror symmetry in relation to a plane of symmetry SE. In this context, they either fall in V-shaped fashion on measuring standard 10 and/or are reflected back in a V-shape from measuring standard 10.

After passing through transparent scanning plate 21, beam of rays $S_{IN}$ incoming from the light source impinges perpendicularly at first point of incidence $P_M$ on measuring graduation 12 of measuring standard 10. There, it is split into two partial beams of rays A, B reflected back in V-shaped fashion to scanning unit 20. In this case, incoming beam of rays $S_{IN}$ is split into symmetrical orders of diffraction $n_{A1}=+1$ and $n_{B1}=-1$, and therefore into the two partial beams of rays A, B, which have identical diffraction or deflection angles $\beta_A=\beta_B$ compared to the direction of incidence of incoming beam of rays $S_{IN}$. In this connection, it holds true that:

$$\sin(\beta_A) = \sin(\beta_B) = \frac{\lambda}{d_M} \qquad \text{(equation 1)}$$

in which:

$\beta_A$ represents the deflection angle of partial beam of rays A compared to the direction of incidence of the incoming beam of rays;

$\beta_B$ represents the deflection angle of partial beam of rays B compared to the direction of incidence of the incoming beam of rays;

$\lambda$ represents the light wavelength; and $d_M$ represents the graduation period of the measuring graduation.

Split partial beams of rays A and B then propagate to first scanning gratings $22_{A1}$ and $22_{B1}$, respectively, on the bottom side of transparent scanning plate 21 and pass through them. In this instance, the two first scanning gratings $22_{A1}$ and $22_{B1}$ combine several optical functions in one common diffractive structure. Thus, due to a deflection effect oriented antiparallel to the direction of incidence, partial beams of rays A, B in the xz-projection (FIG. 1a) are again in each case directed parallel to the optical axis in the z-direction. In the yz-projection (FIG. 1b), partial beams of rays A, B are focused by a cylindrical-lens function onto reflectors $23_A$, $23_B$ on the upper side of scanning plate 21, a focusing effect resulting only perpendicular to direction x of the grating vector of the measuring graduation or along its graduation direction x. Partial beams of rays A, B thus deflected and focused then strike one reflector $23_A$, $23_B$ each, and are reflected there back in the direction of measuring standard 10. After being reflected at reflectors $23_A$, $23_B$, the two partial beams of rays A, B pass through the two second scanning gratings $22_{A2}$, $22_{B2}$, which likewise are disposed on the bottom side of scanning plate 21. The two second scanning gratings $22_{A2}$, $22_{B2}$ combine functions corresponding to the two first scanning gratings $22_{A1}$, $22_{B1}$. Thus, they re-collimate partial beams of rays A, B again by a cylindrical-lens function in the yz-projection (FIG. 1b), and direct them in the xz-projection (FIG. 1c) back again to one common point of incidence $P_M'$ on measuring standard 10, i.e., on measuring graduation 12. In this context, the two partial beams of rays A, B propagate in V-shaped fashion in the direction of measuring standard 10, that is, in the direction of a second point of incidence $P_M'$. There, they are superposed by diffraction again in symmetrical orders of diffraction $n_{A2}=+1$ and $n_{B2}=-1$ and brought to interference, and propagate in signal beam of rays $S_{OUT}$ in the direction of scanning unit 20 and a detector unit, where a plurality of periodic, phase-shifted scanning signals are obtained from signal beam of rays $S_{OUT}$.

As illustrated in FIGS. 1a, 1b, between splitting and recombination, both partial beams of rays A, B extend in mirror symmetry relative to a plane of symmetry SE, which here is identical to the yz-plane from FIG. 1b, and in each case are diffracted at the same points of incidence $P_M$ and $P_M'$, respectively, of measuring graduation 12. Consequently, the neutral pivot point of this scanning optical system lies on measuring standard 10, that is, the scanning optical system is symmetrical V-type. Partial beams of rays A, B reaching interference propagate in mirror symmetry in relation to plane of symmetry SE, are first of all reflected back in V-shaped fashion by measuring standard 10 and then fall in V-shaped fashion on measuring standard 10.

In the in-plane operation shown, signal period SP of the periodic scanning signals generated with this position-measuring device amounts to $SP=d_M/4$. Sensitivity vector $\vec{e}$ is oriented parallel to the grating vector of measuring graduation 12 extending in direction x.

Figure 2A:
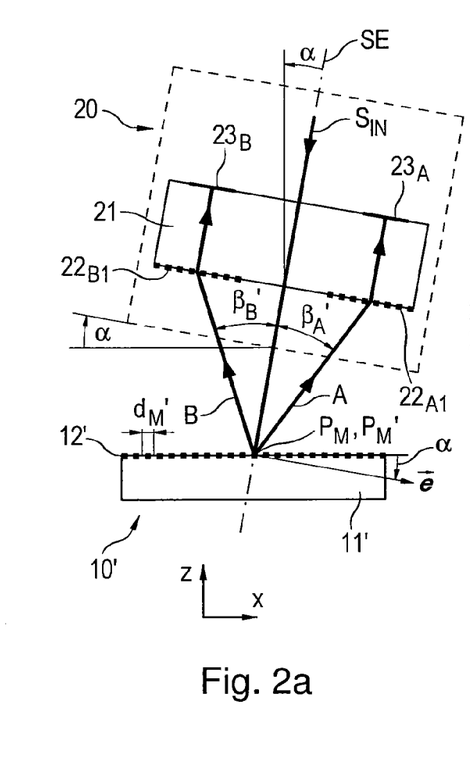
FIGS. 2a to 2c are schematic cross-sectional views of an optical position-measuring device according to an example embodiment of the present invention with an inclined sensitivity vector.
Figure 2B:
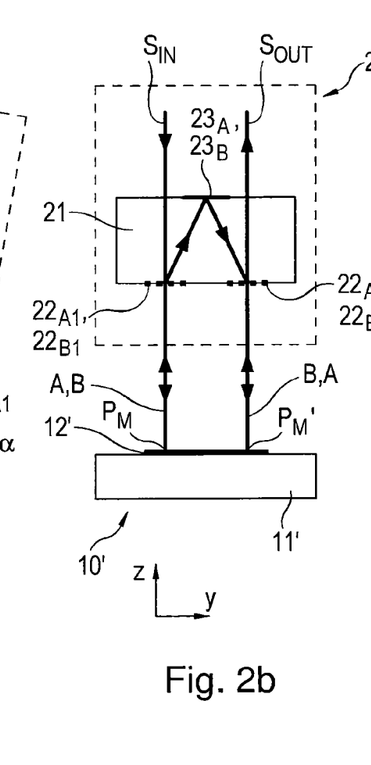
Figure 2C:
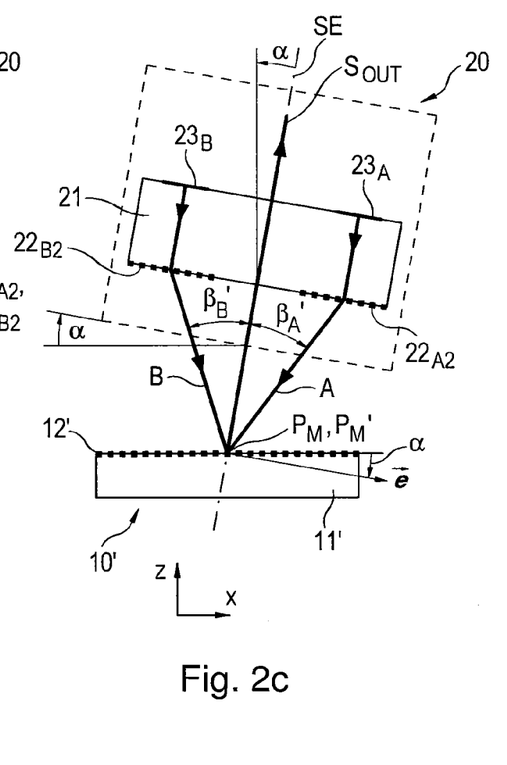

In FIGS. 2a to 2c, an optical position-measuring device according to an example embodiment of the present invention is illustrated, which functions in what is referred to as out-of-plane operation and, as illustrated in FIGS. 2a and 2c, has a sensitivity vector $\vec{e}$ that is inclined compared to the surface of the measuring standard. Consequently, position-dependent scanning signals are thus able to be generated both for the relative movement of scanning unit and measuring standard along first graduation direction x, i.e., along the grating vector of measuring graduation 12 oriented in the x-direction, as well as along direction z perpendicular to it. In this case, the position-measuring device uses the same scanning optical system, that is, the same scanning unit 20, as the position-measuring device illustrated in FIGS. 1a to 1c. In contrast to that, here, however, scanning unit 20, i.e., plane of symmetry SE—as illustrated in FIGS. 2a and 21c—is tilted by a tilt angle α about an axis of rotation in the y-direction; scanning plate 21 provided in scanning unit 20 is then also tilted correspondingly, and therefore disposed perpendicular to plane of symmetry SE. The corresponding axis of rotation is oriented parallel to the surface of measuring standard 10' and extends in a direction perpendicular to the grating vector of measuring graduation 12 oriented in the x-direction. In addition, graduation period $d_M'$ of measuring graduation 12' of the position-measuring device, where $d_M' \neq d_M$, is selected differently from graduation period $d_M$ of measuring graduation 12 of the position-measuring device from FIGS. 1a to 1c explained above. Moreover, different resulting orders of diffraction of measuring graduation 12' are also used for the splitting and superposition of the two partial beams of rays A, B than in the case of the conventional position-measuring device illustrated in FIGS. 1a to 1c. With regard to the traversal and impingement on the various optical elements, the course of the scanning beam path corresponds to the scanning beam path of the position-measuring device illustrated in FIGS. 1a to 1c.

The differences, provided in addition to tilt angle α, between the position-measuring device hereof and that illustrated in FIGS. 1a to 1c are clarified in more detail in the following description.

In the position-measuring device, partial beam of rays A is diffracted twice in the $+3^{rd}$ order of diffraction at measuring graduation 12' ($n_{A1}=n_{A2}=+3$), while partial beam of rays B is deflected twice in the $-1^{st}$ order of diffraction ($n_{B1}=n_{B2}=-1$). Tilt angle α and graduation period $d_M'$ of measuring graduation 12' are selected such that, apart from the tilting of plane of symmetry SE through tilt angle α, the beam path of the scanning optical system remains identical to the beam path of the in-plane operation explained above. That means that diffraction or deflection angles $\beta_A'$ and $\beta_B'$ in the case of the diffraction at measuring graduation 12' of the position-measuring device must be identical to deflection angles $\beta_A = \beta_B$ of the position-measuring device in in-plane operation illustrated in FIGS. 1a to 1c:

$$\beta'_A = \beta'_B = \beta_A = \beta_B \qquad \text{(equation 2)}$$

in which:

$\beta'_A$ represents the deflection angle of partial beam of rays A compared to the direction of incidence of the incoming beam of rays in out-of-plane operation;

$\beta'_B$ represents the deflection angle of partial beam of rays B compared to the direction of incidence of the incoming beam of rays in out-of-plane operation;

$\beta_A$ represents the deflection angle of partial beam of rays A compared to the direction of incidence of the incoming beam of rays in in-plane operation; and $\beta_B$ represents the deflection angle of partial beam of rays B compared to the direction of incidence of the incoming beam of rays in in-plane operation.

Taking into account tilt angle α, the following deflection angles $\beta_A'$ and $\beta_B'$ result for the diffraction at measuring graduation 12' with graduation period $d_M'$ in orders of diffraction $n_{A1}$ and $n_{B1}$, respectively:

$$-\sin(\alpha) + n_{A1} \cdot \frac{\lambda}{d_M'} = \sin(\beta_A' + \alpha) \qquad \text{(equation 3a)}$$

$$-\sin(\alpha) + n_{B1} \cdot \frac{\lambda}{d_M'} = \sin(-\beta_B' + \alpha) \qquad \text{(equation 3b)}$$

in which:

α represents the tilt angle;

$n_{A1}$ represents the order of diffraction of partial beam of rays A in the case of the first diffraction at the measuring graduation;

$n_{B1}$ represents the order of diffraction of partial beam of rays B in the case of the first diffraction at the measuring graduation;

λ represents the light wavelength;

$d_M'$ represents the graduation period of the measuring graduation for out-of-plane operation;

$\beta'_A$ represents the deflection angle of partial beam of rays A compared to the direction of incidence of the incoming beam of rays in out-of-plane operation; and $\beta'_B$ represents the deflection angle of partial beam of rays B compared to the direction of incidence of the incoming beam of rays in out-of-plane operation.

From equations 1, 2, 3a, and 3b, ultimately the following conditions 4a, 4b are obtained for the position-measuring device:

$$-\sin(\alpha) + n_{A1} \cdot \frac{\lambda}{d_M'} = \frac{\lambda}{d_M} \cdot \cos(\alpha) + \sqrt{1 - \left(\frac{\lambda}{d_M}\right)^2} \cdot \sin(\alpha) \qquad \text{(equation 4a)}$$

$$-\sin(\alpha) + n_{B1} \cdot \frac{\lambda}{d_M'} = -\frac{\lambda}{d_M} \cdot \cos(\alpha) + \sqrt{1 - \left(\frac{\lambda}{d_M}\right)^2} \cdot \sin(\alpha) \qquad \text{(equation 4b)}$$

in which:

α represents the tilt angle;

$n_{A1}$ represents the order of diffraction of partial beam of rays A in the case of the first diffraction at the measuring graduation;

$n_{B1}$ represents the order of diffraction of partial beam of rays B in the case of the first diffraction at the measuring graduation;

λ represents the light wavelength;

$d_M'$ represents the graduation period of the measuring graduation for out-of-plane operation; and $d_M$ represents the graduation period of the measuring graduation for in-plane operation.

Equations 4a, 4b may be solved in terms of tilt angle α and graduation period $d_M'$ of the measuring graduation:

$$d_M' = \frac{1}{\frac{1}{2}\sqrt{(n_{A1}-n_{B1})^2 \cdot d_M^2 + (n_{A1}+n_{B1})^2 \cdot \frac{\lambda^2}{1+\sqrt{1-\left(\frac{\lambda}{d_M}\right)^2}}}} \qquad \text{(equation 5a)}$$

$$\alpha = \arctan\left(\frac{n_{A1}+n_{B1}}{n_{A1}-n_{B1}} \cdot \frac{\frac{\lambda}{d_M}}{1+\sqrt{1-\left(\frac{\lambda}{d_M}\right)^2}}\right) \qquad \text{(equation 5b)}$$

in which:

$d_M'$ represents the graduation period of the measuring graduation for out-of-plane operation;

α represents the tilt angle;

$n_{A1}$ represents the order of diffraction of partial beam of rays A in the case of the first diffraction at the measuring graduation;

$n_{B1}$ represents the order of diffraction of partial beam of rays B in the case of the first diffraction at the measuring graduation;

λ represents the light wavelength; and $d_M$ represents the graduation period of the measuring graduation for in-plane operation.

For each asymmetrical pair $n_{A1}$, $n_{B1}$ ($n_A \neq -n_B$) of orders of diffraction, equations 5a, 5b supply an associated tilt angle $\alpha \neq 0$ and a graduation period $d_M' \neq d_M$, via which it is ensured that the scanning beam path extends symmetrically in relation to plane of symmetry SE. Plane of symmetry SE remains unchanged relative to scanning unit 20, and relative to measuring standard 10', is disposed tilted by tilt angle α about an axis of rotation parallel to measuring standard 10' and perpendicular to direction x of the grating vector or the first graduation direction. The path lengths of the two partial beams of rays A, B therefore remain equal, and the scanning optical system—as called for—is also achromatic in out-of-plane operation with inclined sensitivity vector $\vec{e}$. That means that the same achromatic scanning optical system or scanning unit 20 may be used both in the familiar in-plane operation and in the out-of-plane operation. Consequently, a double usage of corresponding scanning unit 20 is possible, and the costly arrangement of a scanning optical system optimized specifically for out-of-plane operation is no longer necessary. For example, this simplifies the logistics considerably for a machine manufacturer who wants to use both operating modes.

Equations 5a, 5b for symmetrical orders of diffraction $n_A = -n_B$ supply the trivial solutions $\alpha=0$ and $d_M' = d_M$ of the in-plane operation of the device illustrated in FIGS. 1a to 1c.

In the case of the resultant diffraction at measuring graduation 12', other combinations of orders of diffraction may also be used for the out-of-plane operation, so long as the combinations are non-symmetrical according to the condition $n_{A1} = n_{A2} \neq -n_{B1} = -n_{B2}$. In addition to the combination with $n_{A1} = n_{A2} = +3$ and $n_{B1} = n_{B2} = -1$ described above, the combination of non-symmetrical orders of diffraction with $n_{A1} = n_{A2} = +1$ and $n_{B1} = n_{B2} = 0$ is also especially favorable. In principle, however, other non-symmetrical combinations of orders of diffraction are also possible, for example, the combinations $n_{A1} = n_{A2} = -3$ and $n_{B1} = n_{B2} = +1$ or $n_{A1} = n_{A2} = +1$ and $n_{B1} = n_{B2} = 0$, etc. For the out-of-plane operation, measuring graduation 12' should be optimized to a high diffraction efficiency of the orders of diffraction used for the signal generation.

In out-of-plane operation, sensitivity vector $\vec{e}$ is inclined by tilt angle α relative to the surface of the measuring standard and to the grating vector of measuring graduation 12' extending in the x-direction, and has the same length as in in-plane operation. That means that signal period $SP_x'$ of the scanning signals generated for a shift of the measuring standard along the x-direction and signal period $SP_z'$ of the scanning signals generated for a shift of the measuring standard in the z-direction are given by the following equations:

$$SP_x' = \frac{SP}{\cos(\alpha)} \quad \text{(equation 6a)}$$

$$SP_z' = \frac{SP}{\sin(\alpha)} \quad \text{(equation 6b)}$$

in which:

$SP_x'$ represents the signal period of the scanning signals generated for a shift of the measuring standard along the x-direction;

$SP_z'$ represents the signal period of the scanning signals generated for a shift of the measuring standard in the z-direction;

SP represents the signal period of the same scanning optical system in in-plane operation; and α represents the tilt angle.

Exemplary values of a first exemplary embodiment of the optical position-measuring device having a light wavelength $\lambda=780$ nm and a graduation period $d_M=2$ μm (in-plane-operation) are summarized in the following Table 1:

TABLE 1

| Operating mode | $n_{A1} = n_{A2}$ | $n_{B1} = n_{B2}$ | α | $d_M'$ | $SP_x'$ | $SP_z'$ |
|---|---|---|---|---|---|---|
| in-plane | +1 | −1 | 0° | — | (SP = 0.5 μm) | — |
| out-of-plane | +3 | −1 | 5.3729° | 4.0365 μm | 0.5022 μm | 5.3398 μm |
| out-of-plane | +1 | 0 | 10.6529° | 1.0360 μm | 0.5088 μm | 2.7048 μm |

Second Exemplary Embodiment

Figure 3A:
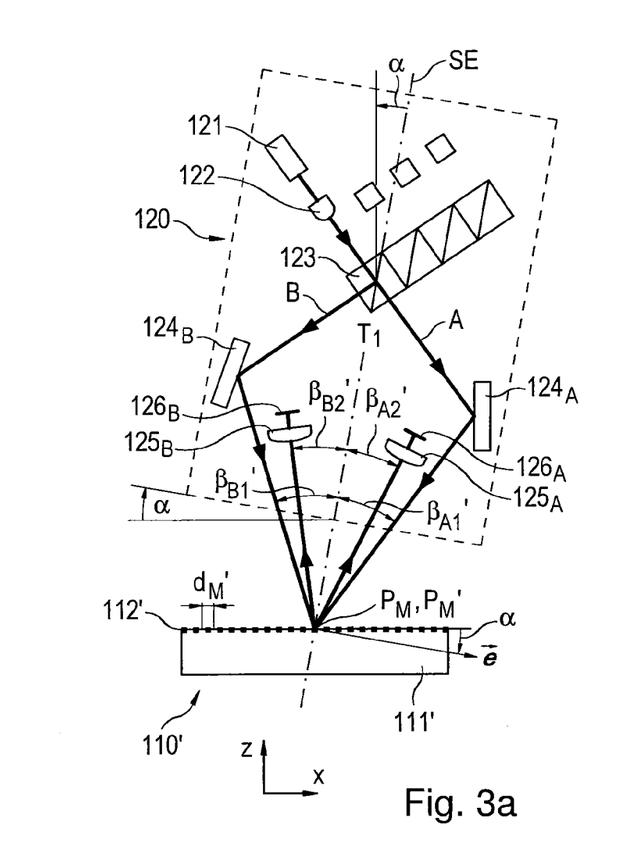
FIGS. 3a and 3b are schematic cross-sectional views of an optical position-measuring device according to an example embodiment of the present invention with an inclined sensitivity vector.
Figure 3B:
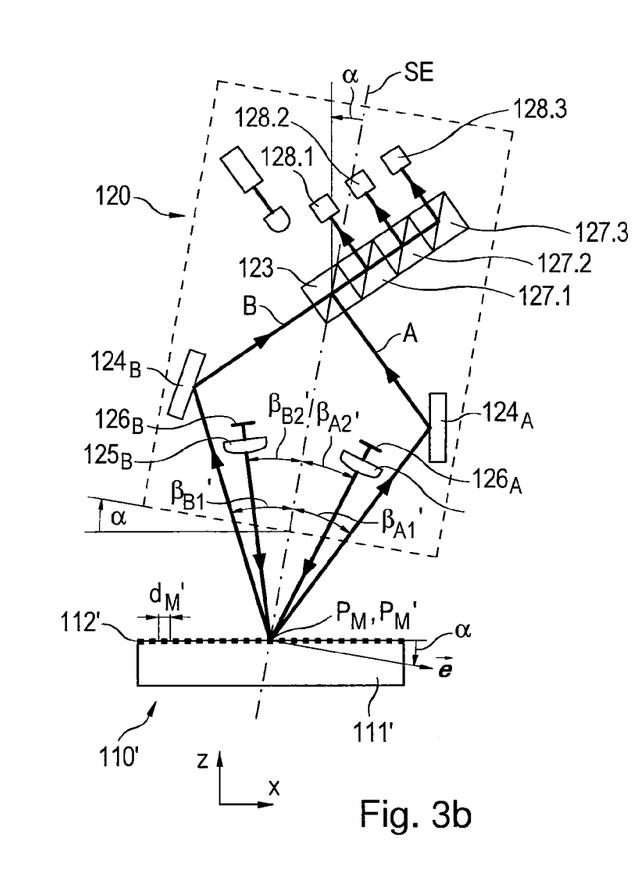

FIGS. 3a and 3b illustrate the scanning optical system of a second exemplary embodiment of the optical position-measuring device in out-of-plane operation, that is, in operation with inclined sensitivity vector $\vec{e}$. Analogous to the depiction of the first exemplary embodiment, FIG. 3a illustrates the course of the beam from light source 121 up to reflectors 126$_A$, 126$_B$ in the xz-plane, and FIG. 3b illustrates the course of the beam in the xz-plane from reflectors 126$_A$, 126$_E$ to detectors 128.1 to 128.3 of a detector unit.

The entire scanning optical system, i.e., scanning unit 120 and thus plane of symmetry SE, is again tilted by a tilt angle α about an axis of rotation. The axis of rotation is oriented as in the preceding exemplary embodiment, namely, parallel to measuring standard 110' and perpendicular to the grating vector of measuring graduation 112' extending in the x-direction. Consequently, in FIGS. 3a, 3b, the axis of rotation is perpendicular to the drawing plane. A reflection phase grating with 180° phase deviation is likewise provided again as measuring graduation 112'.

The beam of rays emitted by light source 121, e.g., a laser diode, is collimated with the aid of a collimating optical system 122 and split by a beam splitter 123 into two partial beams of rays A, B. After being deflected by deflecting elements 124$_A$, 124$_B$, the two partial beams of rays A, B propagate in V-shaped fashion in the direction of one common point of incidence $P_M$ on measuring graduation 112' of measuring standard 110'. There, they are diffracted in +3$^{rd}$ order (partial beam of rays A; $n_{A1} = +3$) and −1$^{st}$ order (partial beam of rays B; $n_{B1} = -1$) in reflection and are reflected in a V-shape back in the direction of scanning unit 120. In scanning unit 120, partial beams of rays A, B then traverse lenses 125$_A$, 125$_B$ a first time and subsequently strike reflectors 126$_A$, 126$_B$, which are located in the focal planes of lenses 125$_A$, 125$_B$. From reflectors 126$_A$, 126$_B$, the partial beams of rays are reflected back in V-shaped fashion in the direction of incidence and then pass a second time through lenses $125_A$, $125_B$. Via the combination of lenses $125_A$, $125_E$ with reflectors $126_A$, $126_B$, a retroreflection of partial beams of rays A, B thus takes place in anti-parallel fashion back to one common point of incidence $P_M'$ on measuring graduation 112'. There, partial beams of rays A, B are diffracted again into the +3$^{rd}$ order (partial beam of rays A; $n_{A2}$=+3) and into the −1$^{st}$ order (partial beam of rays B; $n_{B2}$=−1), respectively, and then propagate via deflecting elements $124_A$, $124_B$ back to beam splitter 123, which superposes both partial beams of rays A, B to form one signal beam of rays. In each case, further three beam splitters 127.1, 127.2, 127.3 subsequently direct the signal beam of rays having the superposed partial beams of rays to detectors 128.1, 128.2, 128.3 of a detector unit, which generate a plurality of periodic, phase-shifted scanning signals.

The phase shift of, e.g., 120° necessary between the scanning signals is achieved by additional polarization-optical components that are not shown in FIGS. 3a and 3b. To that end, prior to being superposed in beam splitter 123, the two partial beams of rays A, B are polarized orthogonally relative to each other. For that purpose, for example, λ/4 plates may be inserted into the beam path of respective partial beams of rays A, B, which they in each case traverse twice. In addition, mounted directly in front of detectors 128.1, 128.2, 128.3 are polarizers whose orientation determines the phase position of the associated scanning signals, so that the desired phase position is thereby able to be adjusted.

Analogous to the previous exemplary embodiment of the position-measuring device, tilt angle α of scanning unit 120 or of plane of symmetry SE and graduation period $d_M'$ of measuring graduation 112' on measuring standard 110' are selected in defined manner in the present second exemplary embodiment, as well. This is provided such that in out-of-plane operation, the same beam path relative to tilted scanning unit 120 results as in the case of in-plane operation of such a scanning unit 120, when plane of symmetry SE is oriented perpendicular to the surface of measuring standard 110'.

In this context, the following equation holds true in the case of the in-plane operation of a scanning unit 120 according to the second exemplary embodiment for deflection angles $\beta_{A1}=\beta_{B1}$ and $\beta_{A2}=\beta_{B2}$ of partial beams of rays A and B, analogous to equation 1 above:

$$-\sin(\beta_{A1}) + \frac{\lambda}{d_M} = \sin(\beta_{A2}) \quad \text{(equation 7)}$$

in which:

$\beta_{A1}$ represents the deflection angle of partial beam of rays A falling on the measuring graduation compared to the plane of symmetry in in-plane operation;

$\beta_{A2}$ represents the deflection angle of partial beam of rays A diffracted by the measuring graduation compared to the plane of symmetry in in-plane operation;

λ represents the light wavelength; and $d_M$ represents the graduation period of the measuring graduation for in-plane operation.

Analogous to equation 2 above, the following must hold true for the present exemplary embodiment:

$$\beta'_{A1}=\beta'_{B1}=\beta_{A1}=\beta_{B1} \quad \text{(equation 8a)}$$

$$\beta'_{A2}=\beta'_{B2}=\beta_{A2}=\beta_{B2} \quad \text{(equation 8b)}$$

in which:

$\beta_{A1}$ represents the deflection angle of partial beam of rays A falling on the measuring graduation compared to the plane of symmetry in in-plane operation;

$\beta_{A2}$ represents the deflection angle of partial beam of rays A diffracted by the measuring graduation compared to the plane of symmetry in in-plane operation;

$\beta_{B1}$ represents the deflection angle of partial beam of rays B falling on the measuring graduation compared to the plane of symmetry in in-plane operation;

$\beta_{B2}$ represents the deflection angle of partial beam of rays B diffracted by the measuring graduation compared to the plane of symmetry in in-plane operation;

$\beta'_{A1}$ represents the deflection angle of partial beam of rays A falling on the measuring graduation compared to the plane of symmetry in out-of-plane operation;

$\beta'_{A2}$ represents the deflection angle of partial beam of rays A diffracted by the measuring graduation compared to the plane of symmetry in out-of-plane operation;

$\beta'_{B1}$ represents the deflection angle of partial beam of rays B falling on the measuring graduation compared to the plane of symmetry in out-of-plane operation; and $\beta'_{B2}$ represents the deflection angle of partial beam of rays B diffracted by the measuring graduation compared to the plane of symmetry in out-of-plane operation.

The diffraction at measuring graduation 112' is described by the following equations 9a, 9b:

$$-\sin(\beta'_{A1} + \alpha) + n_{A1} \cdot \frac{\lambda}{d_M'} = \sin(\beta'_{A2} + \alpha) \quad \text{(equation 9a)}$$

$$-\sin(-\beta'_{B1} + \alpha) + n_{B1} \cdot \frac{\lambda}{d_M'} = \sin(-\beta'_{B2} + \alpha) \quad \text{(equation 9b)}$$

in which:

$\beta'_{A1}$ represents the deflection angle of partial beam of rays A falling on the measuring graduation compared to the plane of symmetry in out-of-plane operation;

$\beta'_{A2}$ represents the deflection angle of partial beam of rays A diffracted by the measuring graduation compared to the plane of symmetry in out-of-plane operation;

$\beta'_{A1}$ represents the deflection angle of partial beam of rays B falling on the measuring graduation compared to the plane of symmetry in out-of-plane operation;

$\beta'_{B2}$ represents the deflection angle of partial beam of rays B diffracted by the measuring graduation compared to the plane of symmetry in out-of-plane operation;

α represents the tilt angle;

$n_{A1}$ represents the order of diffraction of partial beam of rays A in the case of the first diffraction at the measuring graduation in out-of-plane operation;

$n_{B1}$ represents the order of diffraction of partial beam of rays B in the case of the first diffraction at the measuring graduation in out-of-plane operation;

λ represents the light wavelength; and $d'_M$ represents the graduation period of the measuring graduation in out-of-plane operation.

Equations 7a, 7b, 8a, 8b, 9a, 9b may be combined in the following manner:

$$-\sin(\alpha)\cos(\beta_{A1}) - \sqrt{1-\sin(\alpha)^2}\sin(\beta_{A1}) + n_{A1}\cdot\frac{\lambda}{d'_M} = \qquad \text{(equation 10a)}$$

$$\left(-\sin(\beta_{A1}) + \frac{\lambda}{d_M}\right)\cdot\cos(\alpha) + \sqrt{1 - \left(-\sin(\beta_{A1}) + \frac{\lambda}{d_M}\right)^2}\cdot\sin(\alpha)$$

$$-\sin(\alpha)\cos(\beta_{A1}) + \sqrt{1-\sin(\alpha)^2}\sin(\beta_{A1}) + n_{B1}\cdot\frac{\lambda}{d'_M} = \qquad \text{(equation 10b)}$$

$$-\left(-\sin(\beta_{A1}) + \frac{\lambda}{d_M}\right)\cdot\cos(\alpha) + \sqrt{1 - \left(-\sin(\beta_{A1}) + \frac{\lambda}{d_M}\right)^2}\cdot\sin(\alpha)$$

in which:

$\beta_{A1}$ represents the deflection angle of partial beam of rays A falling on the measuring graduation compared to the plane of symmetry in in-plane operation;

α represents the tilt angle;

$n_{A1}$ represents the order of diffraction of partial beam of rays A in the case of the first diffraction at the measuring graduation in out-of-plane operation;

$n_{B1}$ represents the order of diffraction of partial beam of rays B in the case of the first diffraction at the measuring graduation in out-of-plane operation;

λ represents the light wavelength; and $d'_M$ represents the graduation period of the measuring graduation in out-of-plane operation.

Equations 10a, 10b may be solved in terms of tilt angle α and graduation period $d_M'$ of measuring graduation 112' for out-of-plane operation in the following manner:

$$d'_M = \frac{1}{2}\sqrt{(n_{A1}-n_{B1})^2\cdot d_M^2 + (n_{A1}+n_{B1})^2\cdot\frac{\lambda^2}{\cos(\beta_{A1}) + \sqrt{1-\left(\sin(\beta_{A1})-\frac{\lambda}{d_M}\right)^2}}} \qquad \text{(equation 11a)}$$

$$\alpha = \arctan\left(\frac{n_{A1}+n_{B1}}{n_{A1}-n_{B1}}\cdot\frac{\frac{\lambda}{d_M}}{\cos(\beta_{A1}) + \sqrt{1-\left(\sin(\beta_{A1})-\frac{\lambda}{d_M}\right)^2}}\right) \qquad \text{(equation 11b)}$$

in which:

$\beta_{A1}$ represents the deflection angle of partial beam of rays A falling on the measuring graduation compared to the plane of symmetry in in-plane operation;

α represents the tilt angle;

$n_{A1}$ represents the order of diffraction of partial beam of rays A in the case of the first diffraction at the measuring graduation in out-of-plane operation;

$n_{B1}$ represents the order of diffraction of partial beam of rays B in the case of the first diffraction at the measuring graduation in out-of-plane operation;

λ represents the light wavelength; and $d'_M$ represents the graduation period of the measuring graduation in out-of-plane operation.

Tilt angle α and graduation period $d_M'$ of measuring graduation 112', determined according to equations 11a, 11b, ensure that the course of partial beams of rays A, B is also symmetrical in out-of-plane operation, with plane of symmetry SE again remaining unchanged relative to scanning unit 120. The path lengths of the two partial beams of rays A, B remain equal. The sign of tilt angle α may be reversed by permuting the values of $n_{A1}$ and $n_{B1}$, at the same time, the value of graduation period $d_M'$ of measuring graduation 112' remaining the same. Thus, a scanning unit 120 is able to be used in both tilt positions +α and −α in conjunction with the same measuring standard 110'.

Incidentally, equations 11a and 11b represent a generalization of equations 5a and 5b, and in the case of $\beta_{A1}=0$, are identical to them.

Different, non-symmetrical combinations of orders of diffraction for the diffraction at measuring graduation 112' may be used for the out-of-plane operation in this exemplary embodiment, as well.

In out-of-plane operation, sensitivity vector $\vec{e}'$ is again inclined by angle α relative to the surface of the measuring standard and has the same length as in in-plane operation. That means that signal period $SP_x'$ for a shift of the measuring standard along the x-direction and signal period $SP_y'$ for a shift of the measuring standard in the z-direction are again given by equations 6a and 6b.

Exemplary values for the second exemplary embodiment, with a light wavelength λ=780 nm, an angle of incidence $\beta_{A1}=\beta_{B1}=30°$ and a graduation period $d_M=1$ µm of the measuring graduation in in-plane operation, are combined in the following Table 2.

TABLE 2

| Operating mode | $n_{A1} = n_{A2}$ | $n_{B1} = n_{B2}$ | α | $d_M'$ | $SP_x'$ | $SP_z'$ | $\beta_{A2} = \beta_{B2}$ |
|---|---|---|---|---|---|---|---|
| in-plane | +1 | −1 | 0° | — | (SP = 0.25 µm) | — | 16.26° |
| out-of-plane | +3 | −1 | 11.573° | 2.0783 µm | 0.1552 µm | 1.2462 µm | 16.26° |
| out-of-plane | +1 | 0 | 22.272° | 0.5743 µm | 0.2702 µm | 0.6596 µm | 16.26° |

From equations 8a, 8b, 9a and 9b, it is also possible to derive tilt angle α and graduation period $d_M'$ in the out-of-plane operation from predetermined deflection angles $β'_{A1}$ and $β'_{A2}$, respectively, of partial beam of rays A falling on measuring graduation 112' and diffracted by measuring graduation 112' compared to plane of symmetry SE without reference to parameters in the in-plane operation:

$$d_M' = \frac{\lambda}{2} \cdot \frac{\sqrt{n_{A1}^2 + n_{B1}^2 - 2 \cdot n_{A1} \cdot n_{B1} \cdot \cos(β'_{A1} + β'_{A2})}}{\cos\left(\frac{β'_{A1} - β'_{A2}}{2}\right) \cdot (\sin(β'_{A1} + β'_{A2}))}$$ (equation 11c)

$$\alpha = \pm \arccos\left(\frac{(n_{A1} - n_{B1}) \cdot (\cos(β'_{A1}) + \cos(β'_{A2}))}{2 \cdot \cos\left(\frac{β'_{A1} - β'_{A2}}{2}\right) \sqrt{n_{A1}^2 + n_{B1}^2 - 2 \cdot n_{A1} \cdot n_{B1} \cdot \cos(β'_{A1} + β'_{A2})}}\right)$$ (equation 11d)

in which:

$β'_{A1}$ represents the deflection angle of partial beam of rays A falling on the measuring graduation compared to plane of symmetry SE in out-of-plane operation;

$β'_{A2}$ represents the deflection angle of partial beam of rays A diffracted by the measuring graduation compared to plane of symmetry SE in out-of-plane operation;

α represents the tilt angle;

$n_{A1}$ represents the order of diffraction of partial beam of rays A in the case of the first diffraction at the measuring graduation in out-of-plane operation;

$n_{B1}$ represents the order of diffraction of partial beam of rays B in the case of the first diffraction at the measuring graduation in out-of-plane operation;

λ represents the light wavelength; and $d'_M$ represents the graduation period of the measuring graduation in out-of-plane operation.

Third Exemplary Embodiment

Figure 4A:
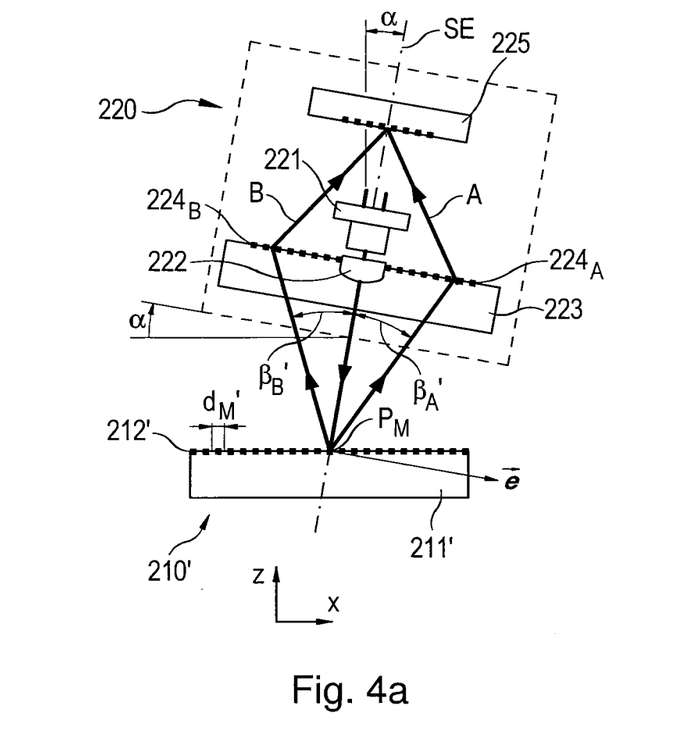
FIGS. 4a and 4b are schematic cross-sectional views of an optical position-measuring device according to an example embodiment of the present invention with an inclined sensitivity vector.
Figure 4B:
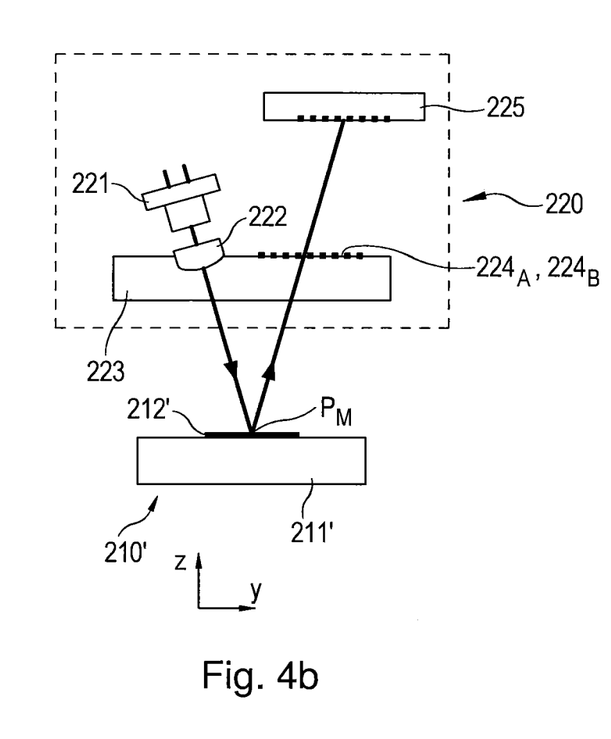

The scanning optical system of a third exemplary embodiment of the optical position-measuring device is illustrated in FIGS. 4a, 4b in out-of-plane operation, e.g., again in operation with inclined sensitivity vector $\vec{e}$. FIG. 4a illustrates the complete course of the beam in the scanning beam path in the xz-plane, FIG. 4b illustrates the course of the beam in the yz-plane.

The scanning optical system, i.e., scanning unit 220 and thus plane of symmetry SE, is tilted by a tilt angle α about an axis of rotation here, as well, the axis of rotation being oriented as in the previous exemplary embodiments. Like in the first example, scanning plate 223 is again disposed perpendicularly in relation to plane of symmetry SE. A reflection phase grating is provided as measuring graduation 212'. The grating vector of measuring graduation 212', i.e., the first graduation direction, is again oriented parallel to the x-direction.

The beam of rays emitted by a light source 221, e.g., taking the form of a laser diode, is collimated by a collimating optical system 222 and directed to measuring graduation 212' of a measuring standard 210'. In this case, the beam of rays passes undeviated through transparent scanning plate 223. Measuring graduation 212' splits the incident beam of rays into the +3$^{rd}$ order of diffraction (partial beam of rays A; $n_{A1}$=+3) and into the −1$^{st}$ order of diffraction (partial beam of rays B; $n_{B1}$=−1), that is, into partial beams of rays A and B, respectively, that are reflected back in a V-shape in the direction of scanning unit 220. In scanning unit 220, partial beams of rays A, B then traverse one scanning grating 224$_A$, 224$_B$ each. In the present exemplary embodiment, both scanning gratings 224$_A$, 224$_B$ are located on the upper side of scanning plate 223, which is oriented facing away from measuring standard 210'. At scanning gratings 224$_A$, 224$_B$, partial beams of rays A, B undergo a diffraction in the −1$^{st}$ order and +1$^{st}$ order, and thus are deflected in the direction of plane of symmetry SE.

Deflected partial beams of rays A, B then propagate in the direction of a structured photodetector 225, where they are superposed and interfere with each other. Due to the interference, a stripe pattern is formed in the detection plane that is detected by structured photodetector 225 and converted into a plurality of periodic, phase-shifted scanning signals.

Tilt angle α and graduation period $d_M'$ of measuring graduation 212' are selected according to equations 5a, 5b above in this exemplary embodiment, as well. The course of the beam is again symmetrical in relation to plane of symmetry SE, which together with scanning unit 220, is tilted by tilt angle α about an axis of rotation in the y-direction. Sensitivity vector $\vec{e}$ is also inclined by tilt angle α. Equations 6a, 6b furnish signal periods $SP_x$, $SP_z$ for a shift of the measuring standard in the x-direction and z-direction for this exemplary embodiment, as well.

Besides the use of the +3$^{rd}$ and −1$^{st}$ orders of diffraction for partial beams of rays A, B, as an alternative, the unsymmetrical orders of diffraction +1 and 0 could also be used at measuring graduation 212' for producing partial beams of rays A, B ($n_{A1}$=+1, $n_{B1}$=0), and so forth.

Figure 5:
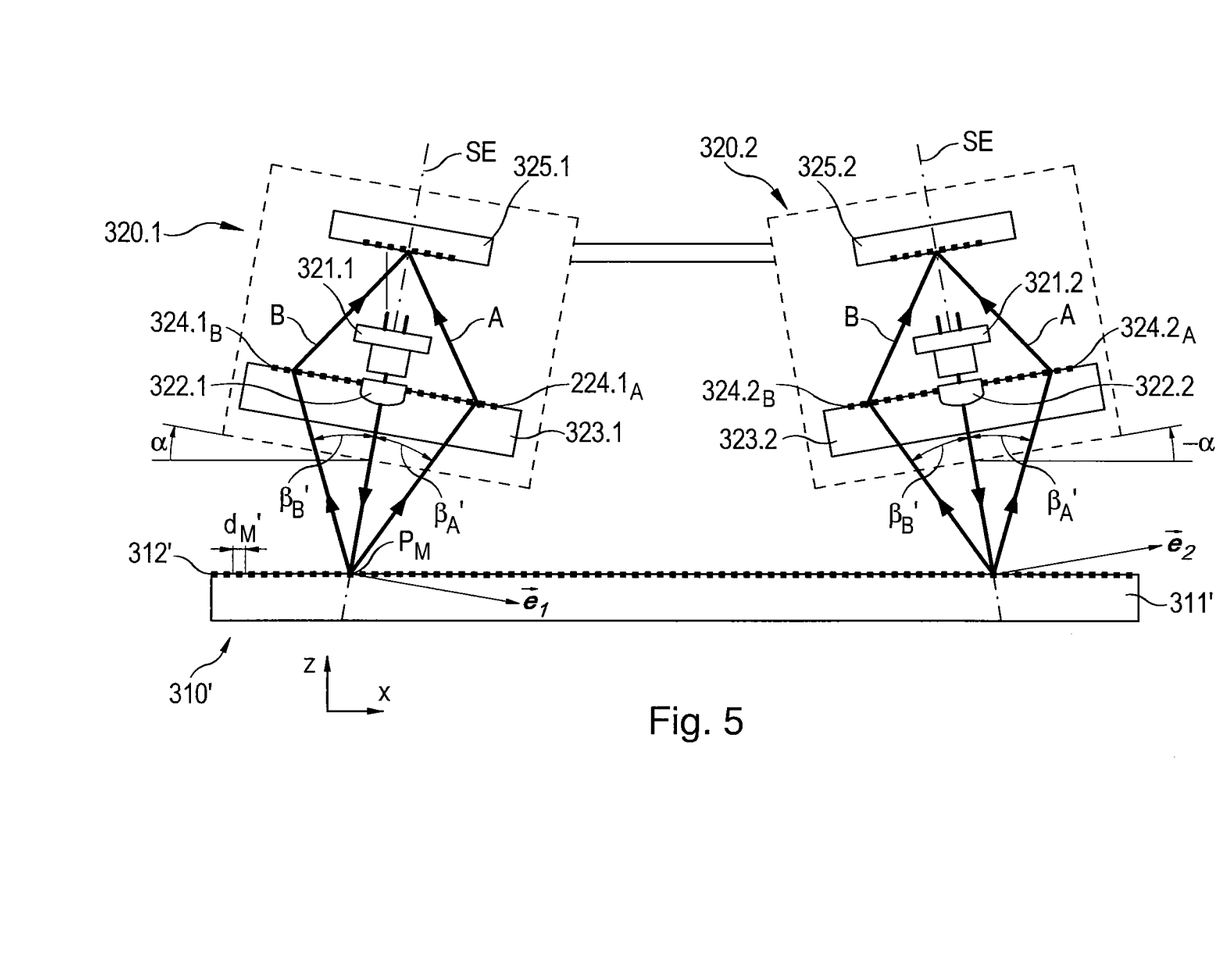
FIG. 5 is a schematic cross-sectional view of a variant of the optical position-measuring device illustrated in FIGS. 4a and 4b.

A first variant of the third example embodiment of the optical position-measuring device is illustrated in FIG. 5. It shows a position-measuring device having two scanning units 320.1, 320.2 according to the third exemplary embodiment explained above. Both scanning units 320.1, 320.2 are joined firmly to each other mechanically and are used for the optical scanning of one single or common measuring standard 310'. First scanning unit 320.1 is tilted by tilt angle +α about a first axis of rotation in the y-direction; on the other hand, second scanning unit 320.2 is tilted by tilt angle −α about a second axis of rotation, likewise oriented in the y-direction, which is oriented parallel to the first axis of rotation. Associated sensitivity vectors $\vec{e}_1$ and $\vec{e}_2$, respectively, are inclined symmetrically with respect to the grating vector of measuring graduation 312' extending in the x-direction. In both scanning units 320.1, 320.2, the arrangement and scanning beam path correspond in each case to the third exemplary embodiment described above.

In this variant, scanning units 320.1, 320.2 supply position phases $Φ_1$ and $Φ_2$, respectively, on the output side, that are obtained according to the following equations 12a, 12b:

$$Φ_1 = \frac{2\pi}{SP_X'} \cdot \Delta x_M - \frac{2\pi}{SP_Z'} \cdot \Delta z_M$$ (equation 12a)

-continued $$\Phi_2 = \frac{2\pi}{SP'_X} \cdot \Delta x_M + \frac{2\pi}{SP'_Z} \cdot \Delta z_M \quad \text{(equation 12b)}$$

in which:

$\Phi_1$ represents the position phase of the first scanning unit;

$\Phi_2$ represents the position phase of the second scanning unit;

$SP_x'$ represents the signal period of the scanning signals generated for a shift of the measuring standard along the x-direction;

$SP_z'$ represents the signal period of the scanning signals generated for a shift of the measuring standard in the z-direction;

$\Delta x_M$ represents the shift of the measuring standard in the x-direction; and $\Delta z_M$ represents the shift of the measuring standard in the z-direction.

By addition and subtraction of position phases $\Phi_1$ and $\Phi_2$ of the two scanning units 320.1, 320.2, z-position $\xi_Z$ and x-position $\xi_X$ of the two scanning units 320.1, 320.2 relative to measuring standard 310' are able to be determined independently:

$$\xi_X = \frac{SP'_X}{4\pi} \cdot (\Phi_1 + \Phi_2) \quad \text{(equation 13a)}$$

$$\xi_Z = \frac{SP'_Z}{4\pi} \cdot (\Phi_2 - \Phi_1) \quad \text{(equation 13b)}$$

in which:

$\xi_x$ represents the x-position of the two scanning units relative to the measuring standard;

$\xi_z$ represents the z-position of the two scanning units relative to the measuring standard;

$\Phi_1$ represents the position phase of the first scanning unit;

$\Phi_2$ represents the position phase of the second scanning unit;

$SP_x'$ represents the signal period of the scanning signals generated for a shift of the measuring standard along the x-direction; and $SP_z'$ represents the signal period of the scanning signals generated for a shift of the measuring standard in the z-direction.

Figure 6:
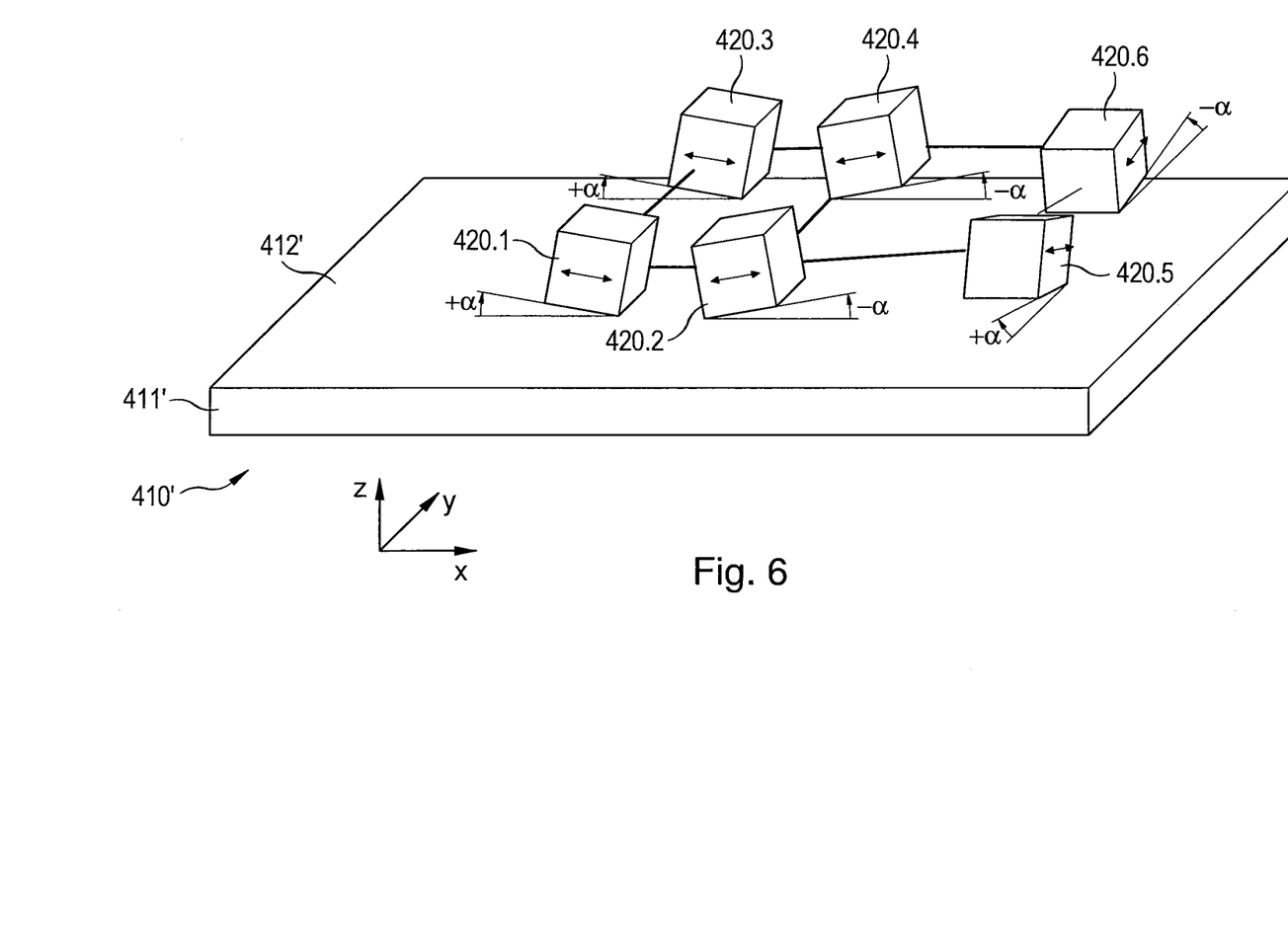
FIG. 6 schematically illustrates a further variant of the optical position-measuring device illustrated in FIGS. 4a and 4b.

A second variant of the third example embodiment of the optical position-measuring device is illustrated in FIG. 6. It illustrates a measuring system which includes three pairs of scanning units 420.1 to 420.6 on the scanning side according to the variant illustrated in FIG. 5. With the aid of the three pairs of scanning units 420.1 to 420.6, a measuring graduation 412' on measuring standard 410' is scanned, which is in the form of a two-dimensional cross grating and therefore has two collinear grating vectors and thus a first and second graduation direction, which in FIG. 6, are oriented parallel to the x-direction and y-direction. In this case, all six scanning units 420.1 to 420.6 are joined rigidly to each other.

The pairs of scanning units 420.1/420.2, 420.3/420.4 and 420.5/420.6, as in FIG. 5, are in each case tilted in opposite direction by tilt angle α. Scanning-unit pairs 420.1/420.2 and 420.3/420.4 are in each instance sensitive with regard to relative movements in the x-direction and z-direction; scanning-unit pair 420.5/420.6 is sensitive with regard to relative movements in the y-direction and z-direction. Each pair of scanning units 420.1/420.2, 420.3/420.4, 420.5/420.6 allows determination of the z-position of the cross-grating measuring graduation relative to scanning units 420.1 to 420.6. In this context, the effective measuring locations for measuring the z-position in each case lie in the middle between the scanning units of each pair. Thus, the z-position of measuring standard 410' is determined at three different and non-collinear locations. In addition, each of the first two scanning-unit pairs 420.1/420.2 and 420.3/420.4 supplies an x-position of measuring standard 410' whose measuring location is different in the y-direction and allows determination of the tilting Rz of measuring standard 410' about the z-axis. Furthermore, scanning-unit pair 420.5/420.6 supplies the y-position of measuring standard 410'. With this arrangement of scanning units 420.1 to 420.6, it is therefore possible to determine the position of measuring standard 410' in all six degrees of freedom x, y, z, Rx, Ry, Rz. It is also possible to determine only a portion of the degrees of freedom using a correspondingly smaller number of scanning units.

What is claimed is:

1. An optical position-measuring device for detecting the position of two objects movable relative to each other, comprising:
a measuring standard joined to one of the two objects and including a measuring graduation having a periodic arrangement of graduation regions along at least a first graduation direction; and
a scanning unit including a plurality of optical elements and being movable relative to the measuring standard, arrangement and formation of the optical elements of the scanning unit adapted to produce a scanning beam path in which partial beams of rays reaching interference propagate in mirror symmetry in relation to a plane of symmetry and either fall in V-shaped fashion on the measuring standard and/or are reflected back in a V-shape by the measuring standard;
wherein the plane of symmetry is tilted by a defined tilt angle about an axis of rotation oriented parallel to a surface of the measuring standard and extends in a direction perpendicular to the first graduation direction; and
wherein a graduation period of the measuring graduation and the tilt angle are selected such that the scanning beam path in the scanning unit is identical to the scanning beam path in an untilted state, in which the plane of symmetry is oriented perpendicular to the surface of the measuring standard.

2. The optical position-measuring device according to claim 1, wherein the partial beams of rays reach interference that result from non-symmetrical orders of diffraction at the measuring graduation.

3. The optical position-measuring device according to claim 2, wherein the partial beams of rays reach interference which result from one of the following combinations of orders of diffraction at the measuring graduation:
   +3$^{rd}$/−1$^{st}$ order of diffraction;
   +1$^{st}$/0$^{th}$ order of diffraction;
   −3$^{rd}$/1+$^{st}$ order of diffraction; and
   −1$^{st}$/0$^{th}$ order of diffraction.

4. The optical position-measuring device according to claim 2, wherein the measuring graduation includes a reflection phase grating optimized to a high diffraction efficiency of the orders of diffraction used for the signal generation.

5. The optical position-measuring device according to claim 1, wherein the scanning unit includes at least one scanning plate having a plurality of optical elements, the scanning plate being disposed perpendicular to the plane of symmetry.

6. The optical position-measuring device according to claim 1, wherein a scanning plate disposed in the scanning unit is transparent, two first and two second scanning gratings are located on a side of the scanning plate facing the measuring standard, and two reflectors are located on an opposite side of the scanning plate, reflecting sides of the reflectors being oriented in a direction of the measuring standard.

7. The optical position-measuring device according to claim 6, wherein the scanning unit is configured such that a beam of rays emitted by a light source:
- strikes the measuring graduation and is split into two partial beams of rays that correspond to two different orders of diffraction and are reflected back in a V-shape to the scanning unit;
- in the scanning unit, the two reflected-back partial beams of rays pass through the two first scanning gratings in the direction of the two reflectors, and in so doing, undergo a deflection effect oriented anti-parallel to the direction of incidence, as well as only a focusing effect perpendicular to the first graduation direction;
- the partial beams of rays thus deflected and focused then in each case impinge on the reflectors, and are reflected back in the direction of the measuring standard;
- the two reflected-back partial beams of rays then pass through the two second scanning gratings in the direction of the measuring standard, and in so doing, undergo a deflection effect in the first graduation direction as well as only a collimating effect perpendicular to the first graduation direction, so that the two partial beams of rays then propagate in a V-shape in the direction of the measuring standard;
- where the superposed partial beams of rays are diffracted once more and reflected back in the direction of the scanning unit.

8. The optical position-measuring device according to claim 1, wherein the scanning unit includes at least one splitting element, two deflecting elements, two reflectors, and two lenses.

9. The optical position-measuring device according to claim 8, wherein the scanning unit is configured such that a beam of rays emitted by a light source:
- is split via the splitting element into two partial beams of rays, which then propagate in a direction of respective deflecting elements;
- the partial beams of rays are deflected via the deflecting elements to propagate in a V-shape in a direction of a first point of incidence on the measuring graduation;
- at the first point of incidence on the measuring graduation, the partial beams of rays in each case undergo a first diffraction and V-shaped reflection back in a direction of the lenses and reflectors in the scanning unit;
- the partial beams of rays traverse the lenses a first time, are reflected back by the reflectors in a V-shape in a direction of incidence and pass through the lenses a second time;
- the partial beams of rays then impinge on the measuring graduation at a second point of incidence, and in each case undergo a second diffraction and a V-shaped reflection back in a direction of the deflecting elements in the scanning unit.

10. The optical position-measuring device according to claim 1, wherein the scanning unit includes at least one transparent scanning plate and a structured photodetector, first and second scanning gratings being disposed on a side of the scanning plate facing an incoming beam of rays.

11. The optical position-measuring device according to claim 10, wherein the scanning unit is configured such that a beam of rays emitted by a light source:
- passes unaffected through the scanning plate and then strikes the measuring graduation, where it is split into two partial beams of rays that correspond to two different orders of diffraction and are reflected back in V-shaped fashion to the scanning unit;
- in the scanning unit, the two reflected-back partial beams of rays pass through one of the two respective scanning gratings, and in so doing, undergo a deflection effect in a direction of the plane of symmetry and then propagate in a direction of the structured photodetector, where they come interferingly to superposition.

12. The optical position-measuring device according to claim 10, wherein a second, identically configured scanning unit is firmly joined mechanically to the scanning unit, the two scanning units being tilted by the same angular amount but in opposite directions about assigned axes of rotation oriented parallel to one another.

13. A measuring system, comprising:
- a measuring graduation formed as a two-dimensional cross grating that includes periodic arrangements of graduation regions along first and second graduation directions; and
- three pairs of position-measuring devices as recited in claim 12, first and second pairs of the position-measuring devices being disposed parallel to the first graduation direction, a third pair of the position-measuring devices being disposed parallel to the second graduation direction.

* * * * *